Patented June 16, 1936

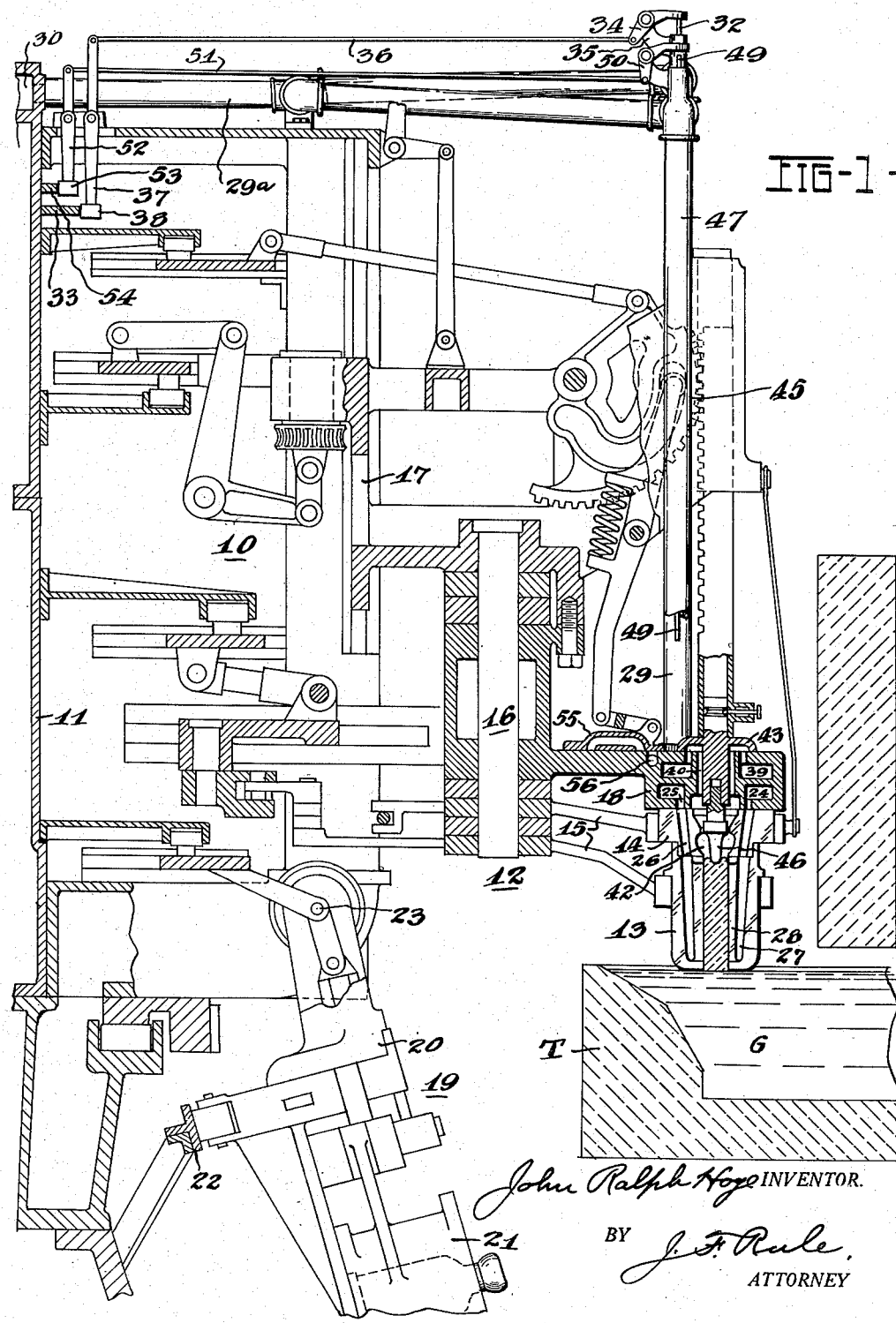

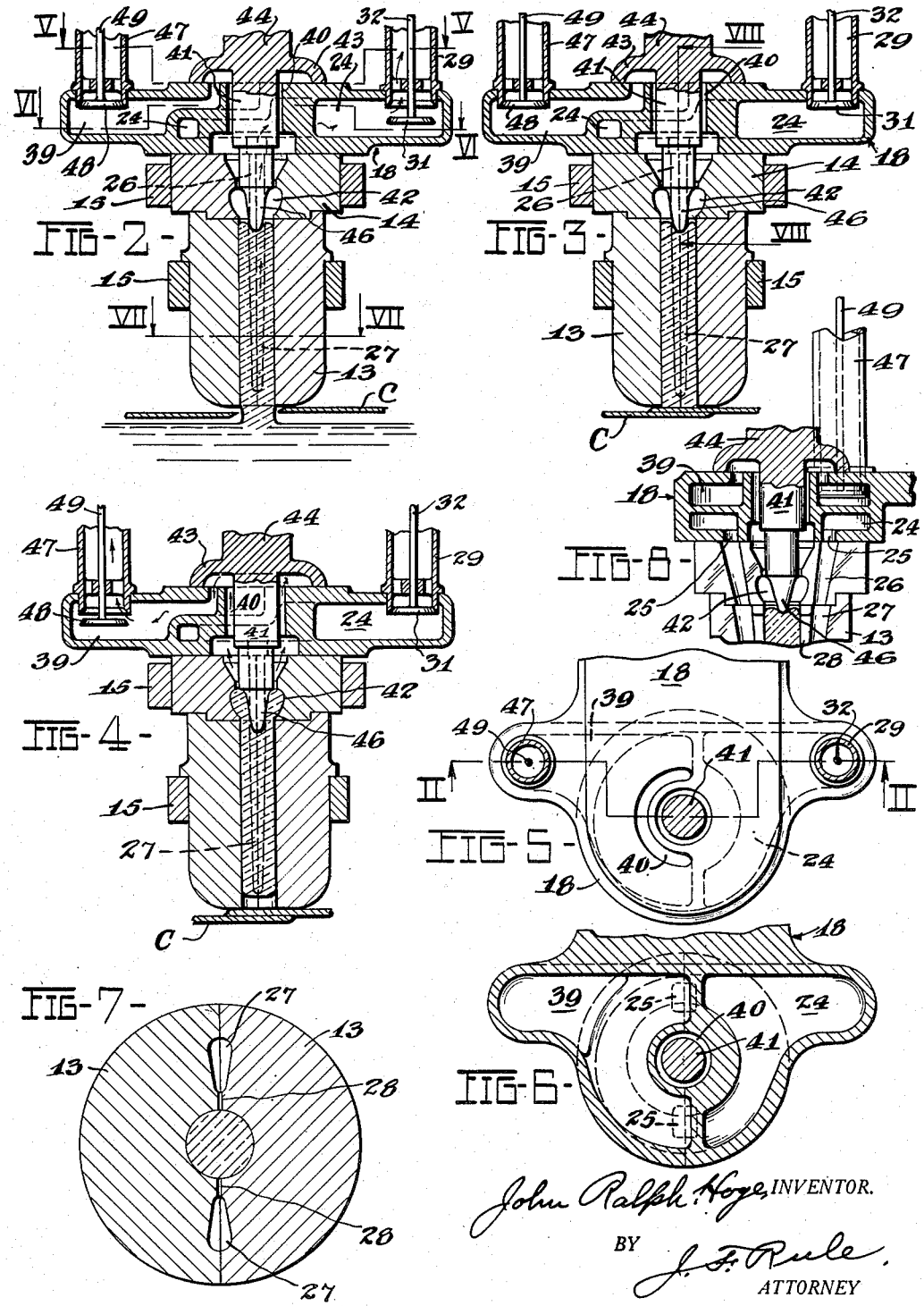

2,044,716

UNITED STATES PATENT OFFICE 2,044,716

GLASSWARE FORMING MACHINE

John Ralph Hoge, Toledo, Ohio, assignor to Owens-Illinois Glass Company, a corporation of Ohio Application July 2, 1934, Serial No. 733,380

2 Claims. (Cl. 49—5)

The present invention relates to improvements in glassware forming machines and particularly to that type in which mold charges of molten glass are gathered by suction blank molds from a supply body of molten glass and by a succession of fabricating operations transformed into hollow articles. Machines of the above character ordinarily consist of an annular series of mold groups or units rotating continuously about a vertical axis so that they are brought one at a time to a series of stations where various operations are performed upon the gathered mold charges. Each mold group includes a partible suction blank mold having a downwardly facing charging opening and a partible finishing mold to which blanks or parisons are transferred from the blank mold for final shaping.

During the initial blank forming operations the glass in the marginal areas of the lower end of the blanks is chilled to such depth that it cannot be sufficiently reheated during the succeeding fabricating operations to prevent appearance in the finished articles in the form of a "cut-off scar". Such a defect is highly objectionable not alone due to its unsightly appearance but mainly because it creates a rough and frequently knife-like edge and sets up strains and stresses in the bottom of the finished article tending to materially weaken the glass structure.

The existence of this cut-off scar is quite properly attributed to chilling of the glass in the marginal corner areas at the lower ends of the blanks or parisons by contact with the cut-off knife and mold wall during and for a short period of time following the charging and charge severing operations. It is clear that because of the metal to glass contact at and in proximity to the point of juncture of the vertical and horizontal bottom surface of the mold charge, the chill is much deeper than at any other point and so much so, that, as stated above, it cannot be sufficiently reheated during the short period of time allotted to the succeeding forming operations to avoid creation of the cut-off scar.

An object of the present invention is to avoid the above objections and faults by materially reducing the period of contact between the cut-off knife and bottom end of the mold charge or blank. To this end there is provided means whereby immediately upon completion of the charge severing operation the mold charge will be moved bodily upward in the blank mold away from the cut-off knife.

Another object is the provision of means whereby a mold charge of slightly less volume than the capacity of the mold cavity is initially delivered to the mold and upon completion of the charge severing operation is moved upwardly by suction away from the cut-off knife.

Other objects will be in part apparent and in part pointed out hereinafter.

In the drawings:

Fig. 1 is a sectional elevational view showing the present invention built into one head of the well known Owens type machine.

Fig. 2 is a fragmentary vertical sectional view taken substantially along the plane of line II—II of Fig. 5.

Fig. 3 is a view similar to Fig. 2 showing the gathered mold charge severed from the supply body.

Fig. 4 is a view similar to Fig. 3 showing the mold charge occupying its uppermost position in the blank mold.

Fig. 5 is a sectional plan view taken along the plane of line V—V of Fig. 2.

Fig. 6 is a sectional view taken along the plane of line VI—VI of Fig. 2.

Fig. 7 is a sectional view taken along the plane of line VII—VII of Fig. 2.

Fig. 8 is a sectional elevational view taken substantially along the plane of line VIII—VIII of Fig. 3.

The illustrated embodiment of the present invention is shown built into a well known Owens type machine such as is illustrated in La France Patent 1,185,687, June 6, 1916, to which reference may be had for details insufficiently set forth herein and constituting no part of the present invention.

This machine includes a mold carriage 10 mounted for rotation about a central vertical column 11 and supporting mold groups 12 or heads. Each mold group comprises a partible body blank mold 13 and partible neck mold 14 constituting the blank forming unit and mounted upon arms 15 suitably connected to a vertical hinge pin 16 which in turn is carried by a dipping frame 17 of conventional or any preferred form. A head casting 18 is mounted on said dipping frame and, as will be brought out presently, is provided with vacuum chambers and passageways through which air may be exhausted from the body blank and neck mold cavities. A finishing mold unit 19 constituting a part of each mold group includes a hinged mold carrier 20 and partible finishing mold 21 thereon. A serpentine track 22 controls the position and movement of the mold carrier 20 and swings the latter about the horizontal axis 23 to bring the mold 21 into position for cooperation with the neck mold 14 at regular time intervals.

The mold charging and blank forming operations, according to the present invention, involve suction gathering of surface glass to substantially fill the body blank mold, this being effected by applying vacuum to the cavity of the body blank mold, only, and later moving the gathered mold charge bodily upward under influence of vacuum applied to the neck mold cavity, only, so that the molten glass flows into and fills said neck mold cavity. Thus the lower end of the mold charge is moved out of contact with the cut-off knife C and is not unduly chilled thereby. The mechanism for accomplishing the above results may well be as follows. The head casting 18 is provided with a vacuum chamber 24 which communicates with the cavity of the body blank mold 13 by way of ports 25 in the lower wall of said chamber and vertical channels 26 in the meeting faces of the neck mold and channels 27 in the meeting faces of the body mold, the latter connected to the body mold cavity by means of vacuum slots 28. A vacuum supply pipe 29 extends upwardly from the chamber 24 and is connected by a horizontal pipe section 29ª to a vacuum supply chamber 30. A valve 31 normally closes the lower end of the pipe 29 and is carried by a stem 32 which is under the control of actuating mechanism adapted to be operated by a stationary cam 33. This actuating mechanism may well include a rocker arm 34 pivoted to a bracket 35 at the upper end of the vertical pipe 29, said rocker arm connected by means of a rod 36 to a lever 37 carrying a cam roll 38 running on said stationary cam 33.

A second vacuum chamber 39 is formed in the head casting 18 and connected by means of an annular vertical conduit 40, encircling a plunger holder 41, to a neck mold cavity 42, communication between said chamber and conduit 40 being established by seating a cup-like cap 43 upon the head casting, said cap carried by a plunger rod 44 which incidentally may be moved vertically by conventional rack and pinion mechanism 45 in the usual well known manner. A plunger 46 adapted to cooperate with the neck in forming the neck and finish of an article, is attached to the plunger holder 41 in any approved fashion. A vacuum supply pipe 47 extends vertically upward from the chamber 39 and is connected by way of the horizontal pipe section 29ª to the vacuum chamber 30. A valve 48 arranged to normally close the lower end of the vacuum pipe 47 is supported by a valve stem 49 which is moved periodically for the purpose of opening the valve by means of a rocker arm 50 which is connected through a push rod 51 to a lever 52. A cam roll 53 on the lever 52 rides upon a stationary cam 54 which is shaped to rock said lever and rocker arm 50 and thereby open the valve 48.

In providing for the final blowing operation through which the blanks or parisons are expanded in the finishing mold, a blow slide 55 is arranged on the upper side of the head casting 18 so that it can replace the cap 43 when the plunger 46 is removed from the neck mold and establish communication between the neck mold cavity and an air pressure conduit 56 which may be connected to any suitable source of supply of air under pressure (not shown).

In operation, the mold group is brought to a mold charging position with respect to a supply body of molten glass G in a tank T so that the bottom end of the body mold makes sealing contact with the surface of the glass. The valve 31 is then opened resulting in application of vacuum to the cavity of the body blank mold and consequent gathering of sufficient glass to substantially fill this particular cavity only. Immediately thereafter the mold is lifted away from the glass and the cut-off knife C operated to sever the gathered mold charge from the supply body. This cut-off knife C also closes the bottom end of the mold cavity. The valve 31 is then closed and simultaneously therewith the valve 48 controlling the application of vacuum to the neck mold cavity is opened. This results in bodily upward movement of the mold charge to fill the neck mold cavity and break contact between the mold charge and cut-off knife. The blank forming operations having been completed the plunger 46 is removed and simultaneously therewith the blow slide 55 is moved into position to close the central opening in the head casting 18. The body blank mold is then opened and the finishing mold raised and closed about the blank or parison which at this time is suspended from the neck mold. Air under pressure is then introduced through the neck mold to expand the blank to its final form as is customary.

Modifications may be resorted to within the spirit and scope of the appended claims.

What I claim is:

1. A glassware forming machine including partible cooperating body blank and neck molds having aligned cavities, the body mold having a downwardly facing charging opening, means for bringing the molds into a position to effect sealing contact between the charging opening and a supply body of molten glass, means for exhausting the air from the body mold cavity, to thereby deliver a mold charge to the latter, means for severing the mold charge in the body mold from said supply body, and independent means operating thereafter for exhausting the air from the neck mold cavity and solely thereby moving the mold charge bodily upward to fill the neck mold cavity.

2. In combination, a blank forming unit including partible cooperating body blank and neck molds having aligned cavities, the cavity in the body blank mold having a downwardly facing charging opening, means for bringing the mold into charging contact with a supply body of molten glass while the body blank and neck molds are aligned, suction means for transferring a mold charge to the body mold cavity, means for severing the mold charge from the supply body, and independent means employing suction exclusively for moving the mold charge bodily upward to fill the neck mold cavity and move said mold charge out of contact with the charge severing means.

JOHN RALPH HOGE.